United States Patent
Mazzurco et al.

(10) Patent No.: US 6,795,393 B1
(45) Date of Patent: Sep. 21, 2004

(54) METHOD AND APPARATUS FOR ERRORLESS PATH PROTECTION AND REARRANGEMENT

(75) Inventors: Anthony Mazzurco, Plano, TX (US); Joseph A. Crossett, III, Richardson, TX (US); Jie Hu, Santa Rosa, CA (US)

(73) Assignee: Alcatel USA Sourcing, L.P., Plano, TX (US)

( * ) Notice: Subject to any disclaimer, the term of this patent is extended or adjusted under 35 U.S.C. 154(b) by 775 days.

(21) Appl. No.: 09/690,153

(22) Filed: Oct. 16, 2000

Related U.S. Application Data

(60) Provisional application No. 60/173,055, filed on Dec. 24, 1999.

(51) Int. Cl.[7] ............ G01R 31/08; G06F 11/00; G08C 15/00; H04J 1/16; H04L 1/00
(52) U.S. Cl. ............ 370/217; 370/244; 370/250
(58) Field of Search ................ 370/463, 538, 370/384, 254, 426, 388, 387, 220, 367, 420, 375, 377, 376, 380, 378, 217, 218, 219, 372, 244, 250; 714/821, 4; 340/2.1, 2.2, 2.27, 2.28

(56) References Cited

U.S. PATENT DOCUMENTS

| | | | | |
|---|---|---|---|---|
| 3,629,512 A | * | 12/1971 | Yuan ................ | 340/2.21 |
| 5,201,045 A | * | 4/1993 | Pflueger et al. ............. | 714/4 |
| 5,208,803 A | * | 5/1993 | Conforti et al. .......... | 370/241 |
| 5,790,519 A | * | 8/1998 | Hanson et al. ............ | 370/220 |
| 5,923,643 A | * | 7/1999 | Higgins et al. ........... | 370/218 |
| 5,953,333 A | * | 9/1999 | Fox et al. ................. | 370/360 |
| 5,982,746 A | * | 11/1999 | Hanson et al. ............ | 370/220 |
| 6,005,841 A | * | 12/1999 | Kicklighter .............. | 370/217 |
| 6,498,792 B1 | * | 12/2002 | Johnson et al. .......... | 370/388 |
| 6,621,828 B1 | * | 9/2003 | Field et al. ............... | 370/466 |
| 2003/0147384 A1 | * | 8/2003 | Landaveri et al. ........ | 370/372 |

* cited by examiner

*Primary Examiner*—Wellington Chin
*Assistant Examiner*—Jamal A. Fox
(74) *Attorney, Agent, or Firm*—James Harrison; Jessica W. Smith; V. Lawrence Sewell

(57) ABSTRACT

An apparatus and a method for cross connect matrices includes originating, center and terminating stages in both a main portion and a back-up portion that allows center stages to be switched without causing a framing error. The signal from the main portion is transmitted through both the back-up and main portions of the cross connect matrices such that a terminating line card receives a frame aligned signal from the main and back portions. The terminating line card then switches its output to be the signal produced by the back-up portion with no framing error. In the main portion, the center stage may be switched. After the center stage is switched, the terminating line card can switch again to output the signal from the main portion.

17 Claims, 8 Drawing Sheets

METHOD AND APPARATUS FOR ERRORLESS PATH PROTECTION AND REARRANGEMENT

PRIORITY STATEMENT UNDER 35 U.S.C. § 119(e) and 37 C.F.R. § 1.78.

This non-provisional application claims priority based upon the following prior U.S. provisional patent application entitled: "Method and Apparatus for Errorless Path Protection and Rearrangement", Ser. No. 60/173,055, filed Dec. 24, 1999, in the names of: Anthony Mazzurco, Joseph A. Crossett, III, and Jie Hu.

BACKGROUND

1. Technical Field

The present invention relates generally to communication networks, and more particularly, to digital cross connect systems.

2. Related Art

Because new data, voice and imaging applications are causing a fundamental shift in the nature of network traffic, the network architecture is required to evolve to accommodate this change. Instead of being dominated by voice data as in the past, the network traffic will increasingly carry bursty high-speed data transmissions. User applications and new network technologies including frame relay, switched multi-megabit data service and asynchronous transfer mode (ATM) are driving the transport network toward the synchronous optical network (SONET). SONET is a new transport medium, designed to enable communications between central offices. It defines optical signals and synchronous frame structure for multiplexed traffic as well as for operations and maintenance procedures.

As a result of the new demands being placed on telecommunication networks, switching systems must be designed to rapidly and correctly switch signal paths so as to properly route a signal or series of signals. Digital Cross Connect Systems achieve this result. A digital cross connect system is a specialized type of high-speed data channel switch that is used in modern telecommunication networks. Digital cross connect systems differ from normal voice network switches in that voice network switches make switching changes in the network responsive to dialing instructions by the user or calling party. In digital cross connect systems, however, specific and separate instructions are used to control the network switching. The separate instructions are given independently of any calls being routed through the system. Stated differently, switching instructions and voice go together in normal voice networks while they are transmitted separately in networks utilizing digital cross connect systems. Switching commands for a digital cross connect system may be given either by an operator at a control console or a computer algorithm, or both may specify them.

Digital cross connect systems work integrally with modem signaling systems to transfer control information between elements of an Integrated Services Digital Network (ISDN) and of Signaling System Number 7 (SS7). The purposes of a signaling system is to transfer control information (signaling units) between elements in a telecommunications network. In the modern networks, the signaling units are transmitted in separate channels.

All service providers including exchange carriers, long distance carriers and competitive bypass carriers are increasingly using digital cross-connect systems. Existing digital cross-connect system architectures generally have been based on a single core approach in which all cross-connections are made through a single switching node or fabric. To handle layered signal structures used in today's transport networks these single switching nodes have been connected in series.

A typical arrangement of digital cross connect systems for a given network includes having a plurality of matrix elements connected in a multiple stage arrangement. In a three stage arrangement, a given cross connect system includes O stage matrix elements, C stage matrix elements and T stage matrix elements, where each O stage can support a connection to each C stage, and where each C stage can support a connection to each T stage. Each matrix element is formed to allow an operator (or program) to selectively create signal paths by closing connections between lines that are coupled to signal controlled switches.

In a simple non-blocking matrix, an input stage matrix has two outputs for every input. A center stage matrix has an equal number of inputs to outputs, the number of inputs and outputs being equal to the number of outputs of the input stage matrix. The output stage matrix has twice the number of inputs to outputs in this arrangement, the number of outputs being equal to the number of inputs of the input stage matrix. The number of inputs for the output stage matrix is equal to the number of outputs of the input stage matrix.

Some prior art networks that utilize cross connect matrices include a primary as well as a backup cross connect matrix arrangement to provide redundancy in the event of a failure in a primary or main path. In one particular arrangement, a line card is used to receive a signal and to transmit it to the originating stages of the main and the backup cross connect matrices. In another arrangement, separate line cards receive the signal from main and backup transmission paths. One line card produces the received signal to a originating stage matrix for the main cross connect matrix arrangement while the other line card produces the received signal to the backup cross connect matrix arrangement. At the output end of the matrix arrangements, one line card receives the output signals from the terminating stage matrices of the main and backup matrix arrangements and selects one of the signals for outputting from the network.

The embodiment having two input line cards is advantageous in that back-up path cross connect switching exists to provide redundancy and to overcome primary or main path failures. One shortcoming, however, is that switching paths from a primary path to a back-up path at an output stage or line card often results in framing errors requiring a portion of a signal transmission to be regenerated. Sometimes, it is necessary to switch center stages in a primary matrix for maintenance. For example, it is sometimes necessary to switch center stages in a cross connect matrix to alleviate blocking for new connections. Under the current techniques, framing errors are often introduced when the center stage is switched in a cross connect matrix network.

One reason the framing errors exist is that each line card, in the embodiment utilizing two input line cards, receives its respective signals from different network paths, the primary and backup signals are not received in frame alignment. Accordingly, switching from the primary matrix to the backup matrix as a part of switching center stages of the matrix network results in the introduction of framing errors or delays that require a signal to be re-framed. What is needed therefore is a solution that allows for center stages to be switched in a configuration that incorporates two input line cards.

SUMMARY OF THE INVENTION

To overcome the shortcomings of the prior systems and their operations, the present invention contemplates an apparatus and a method for a digital cross connect system for switching center stages within the main and back-up matrix arrangements without losing downstream framing alignment. The method includes routing the primary signal through the back-up path matrix to the terminating line card instead of the back-up signal while also temporarily routing the primary signal through the primary matrix. Thereafter, the output signal from the back-up matrix is selected, the center stages are switched in the primary matrix and then the output signal from the primary matrix is reselected. Now, the backup matrix may be rearranged if desired.

Because the primary signal is being propagated through both the primary and the back-up path matrices, the output of the two paths are frame aligned. When the output is switched from the primary path to the back-up path, therefore, there are no framing errors encountered. Once the center stages have been successfully switched, then the primary signal is reselected from the primary (main) portion of the matrix network. The back-up path is rearranged so that signaling is conducted through the back-up path once again in the event that a failure occurs in the primary path.

Other aspects of the present invention will become apparent with further reference to the drawings and specification that follow.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
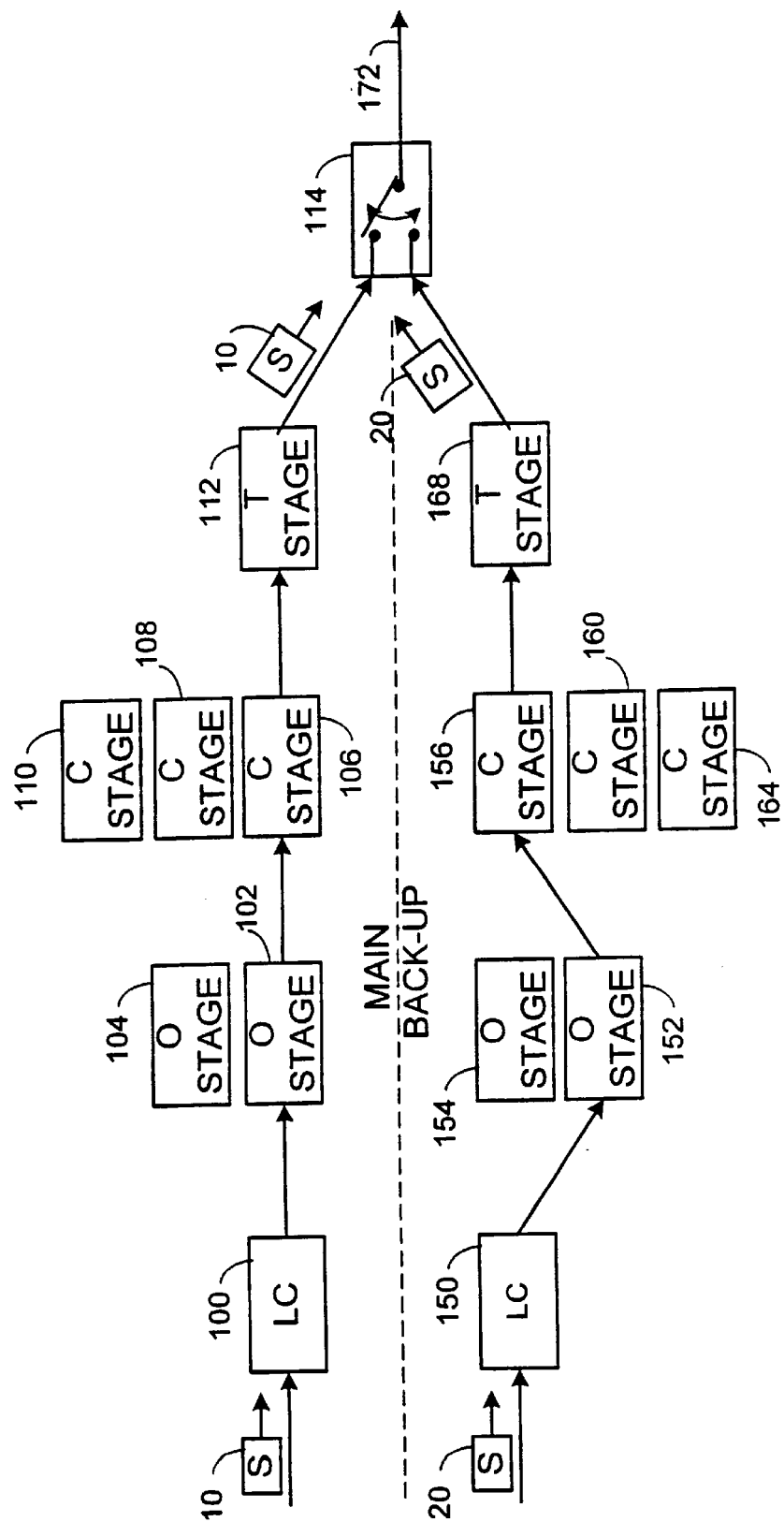
FIGS. 1–5 are functional block diagrams that illustrate a plurality of different connections that are created in a main and backup network in order to switch center stages in a digital cross connect matrix without introducing framing errors according to one embodiment of the present invention.

FIGS. 1–5 are functional block diagrams that illustrate a plurality of different connections that are created in a main and backup network in order to switch center stages in a digital cross connect matrix without introducing framing errors according to one embodiment of the present invention. Referring now to FIG. 1, the network shown includes two parts. The first part is the main portion of the network and is primarily used to transmit a signal through the network. The second part is a backup portion of the network that is used to transmit a back-up path signal (protection path) in the event of a failure within the main network portion.

Typically, a backup portion of a network includes the network elements and a signal path that is fully redundant to the main portion. Moreover, the implementation is designed so that a failure in the main portion does not prevent the transmission of the signal in the backup portion. In the described embodiment, the main portion of the network includes a line card 100 for receiving a signal 10, a pair of O-stage cross connect matrices 102 and 104, three center stage cross connect matrices, and one terminating stage cross connect matrix.

More specifically, a line card 100 receives a signal 10 from an external source and is able transmit it to the O-stage cards 102 or 104. In the described embodiment, line card 100 transmits the signal to O-stage card 102. As may be seen, relative to the received signal, line card 100 is not coupled to O-stage card 104. O-stage card 102, in turn, transmits the received signal to a center stage card. In the described embodiment, O-stage card 102 transmits signal 10 to center stage card 106. Again, as may be seen, center stage cards 108 and 110 are not coupled to any prior O-stage card relative to the signal being conducted herein the main portion of the network. Center stage card 106 transmits a signal to terminating stage card 112 that conducts the signal to line card 114.

With respect to the backup portion of the network, a second line card 150 receives signal 20. Signal 20 is the same signal that line card 100 received, although, the signal may be received with a different delay relative to when it is received by line card 100. Upon receiving signal 20, line card 150 transmits it to O-stage card 152. As before, O-stage card 154 is not connected to line card 150 with respect to the received signal. O-stage card 152 in turn transmits the received signal to center stage card 156. Center stage cards 160 and 164 are not connected to any prior O-stage card relative to the received signal. Center stage card 156 then transmits the signal to terminating stage card 168, which in turn transmits the signal to line card 114.

Line card 114 selects between the signals received from terminating stage card 112 or terminating stage card 168. The selected signal is then output from the cross connect circuit on output line 172. In operation, it may be seen that a signal received by line card 100 is eventually conducted to center stage card 106. The signal received by line card 150, however, is transmitted through center stage card 156.

Continuing to examine FIG. 1, it may be seen that line card 114 is coupled to receive signal 10 from terminating stage card 112 and signal 20 from terminating stage card 168. Because the input signals received by line cards 100 and 150 are not necessarily frame aligned, signals 10 and 20 may not be frame aligned as they are received by line card 114. Thus, the possibility exists that changing signals from either terminating stage card 112 or terminating stage card 168 for outputting on line 172 may result in a framing error, even though signals 10 and 20 are the same in form, because they are not frame aligned. A framing error will exist whenever line card 114 changes signals from signal 10 to signal 20 or vice-versa for outputting one line 172 if the signals 10 and 20 are not frame aligned when received by line cards 100 and 150.

Figure 2:
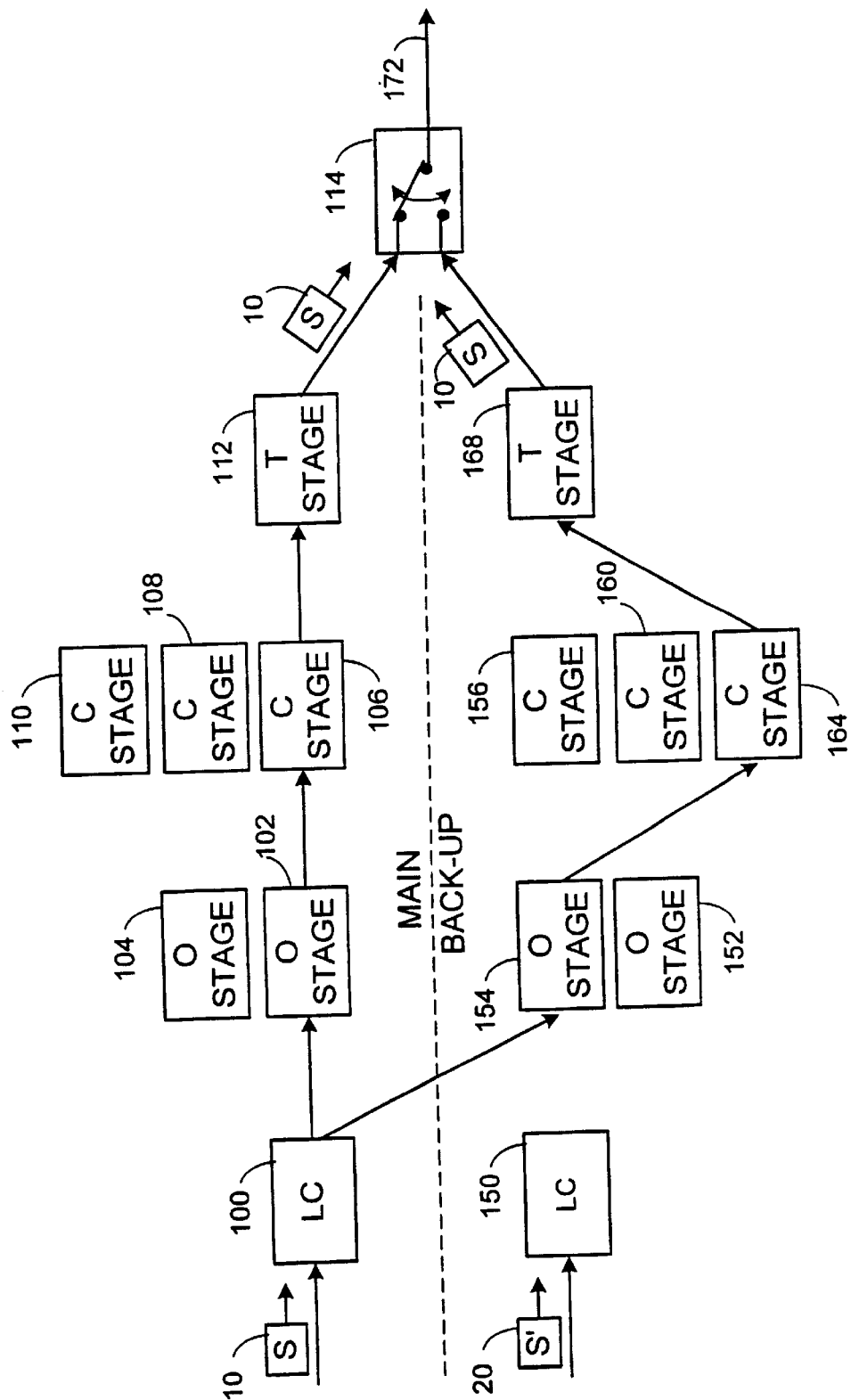

FIG. 2 illustrates a set of connections created to enable the switching of center stages in a manner that avoids framing errors. More specifically, the signal received by line card 100, as before, is transmitted through originating stage card 102, through center stage card 106, and through terminating stage card 112. Here, however, a signal received by line card 100 also is transmitted to originating stage card 154 of the backup portion of the network which corresponds to the O stage card 102 of the main portion of the matrix. In the example of FIG. 2, a signal received by originating card 154 is transmitted to center stage card 164 and then to terminating stage card 168. Terminating stage 168 then selects the signal from center stage 164 rather than 156 for transmission to line card 114.

The output signals from terminating stage card 112 and terminating stage card 168 are both produced to line card 114 as before. Here, no framing error is introduced if line card 114 switches its output from being signal 10 of terminating stage card 112 or signal 10 of terminating stage card 168 or vice-versa since aligned phase propagation through the matrix is guaranteed. While the example of FIG. 2 illustrates that line card 100 transmits signal 10 to O stage card 154, it is understood that the signal could have been transmitted to O stage card 152. Similarly, line card 150 could be used to produce the signal 20 for transmission through the main and back-up portions of the network.

Figure 3:
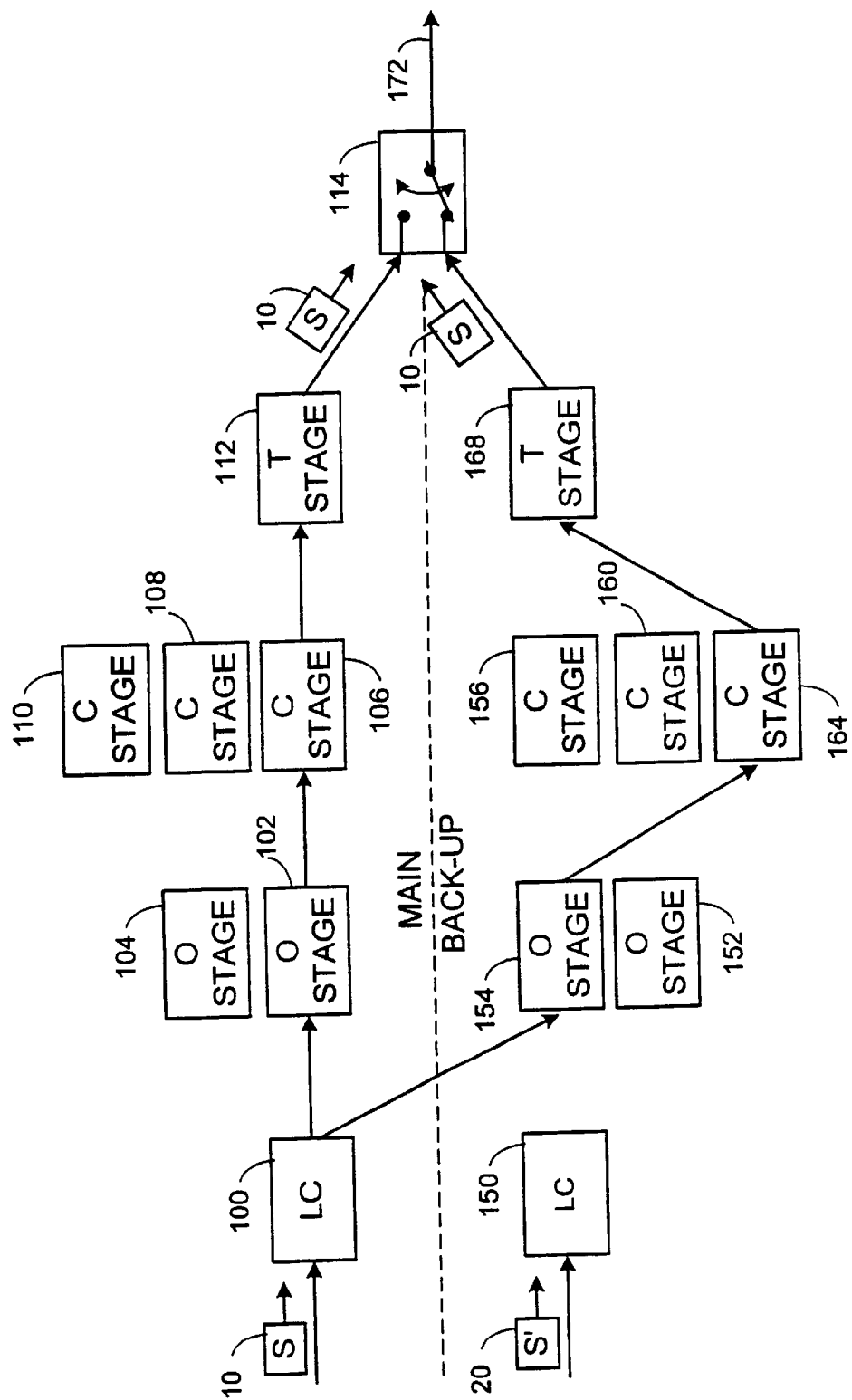
Figure 4:
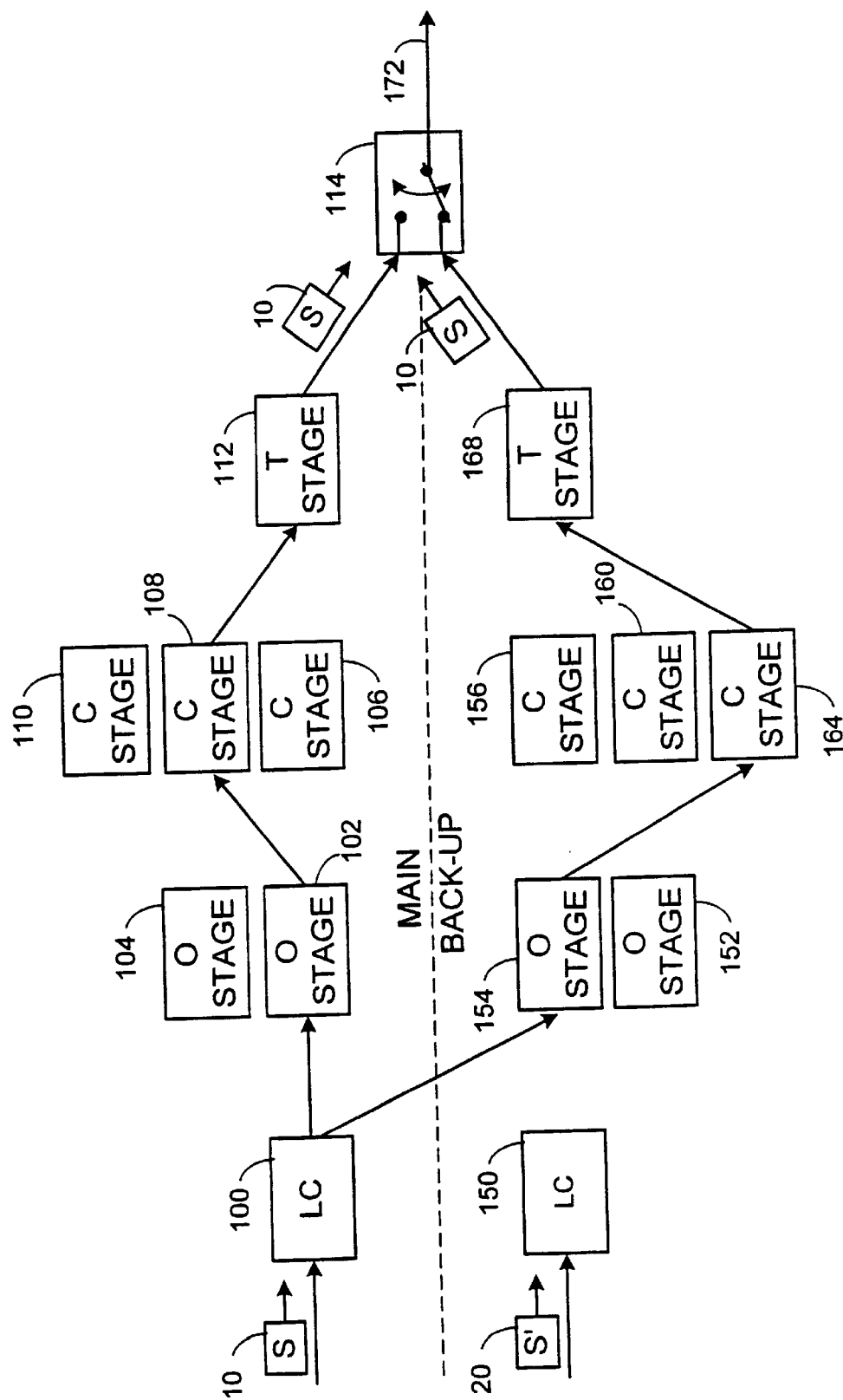

FIG. 3 is very similar to FIG. 2 with one exception. It illustrates that line card 114 has indeed switched positions. It is understood that the graphic for line card 114 is of a signal pole double throw switch for illustrative purposes and to clearly show which input is being selected for output on line 172. As stated before, line card 114 may switch from outputting the signal received from terminating stage card 112 to terminating stage card 168 without introducing framing error problems. The reason, as suggested before, is that each signal 10 comes from the same line card 100 and delay through both matrix portions is identical by design. Thus, each signal 10 is necessarily frame aligned. FIG. 4 illustrates that signal 10 still originates from line card 100 but is being conducted through the originating, center and terminating stages of the backup portion of the network. FIG. 4 also illustrates, however, that originating stage 102 no longer is connected to center stage 106. Rather, originating stage 102 is connected to center stage 108 which, in turn, is connected to terminating stage 112. Thus, FIG. 4 illustrates that the center stages in the main portion of the network have been rearranged.

Because the signals being transmitted through the center stages of both the main portion and backup portion of the network originate from the same line card, line card 114 may switch to receive the signal from the main portion of the network, and more specifically, from terminating card 112 once again without introducing framing errors. Once a signal path has been created from line card 100 of the main network portion through the originating center and terminating stages of the backup network portion, the center stages may be switched in the main portion without consequence.

Figure 5:
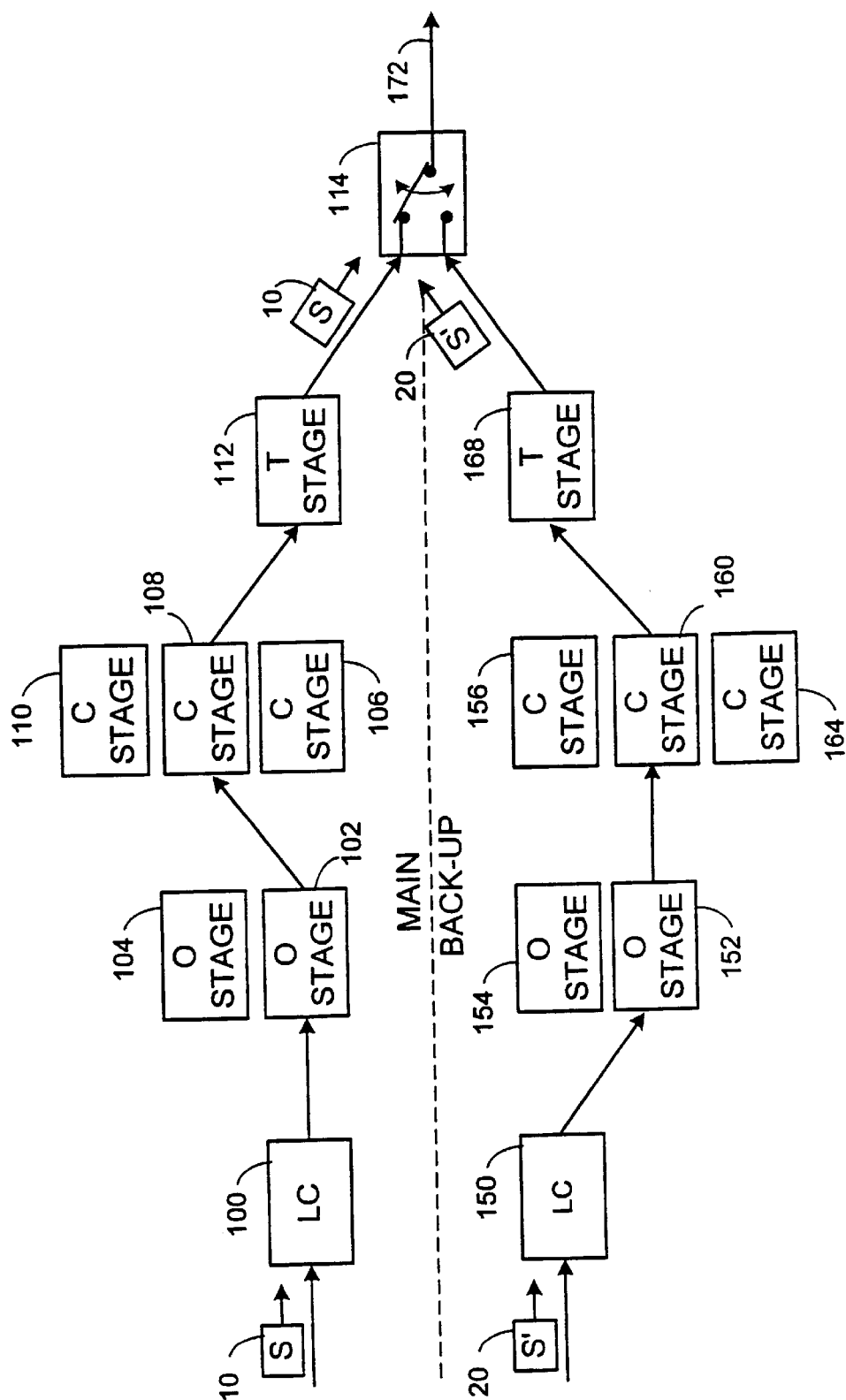

FIG. 5 illustrates that line card 114 has selected signal 10 from terminating stage card 112 for outputting on line 172. FIG. 5 further illustrates that the center stages in the backup portion of the network have been switched to center stage 160 to match that of the main portion of the network. The second center stage card of each network portion is now being used for conducting the signal 10 and back-up signal 20. Because line card 114 is receiving the signal from terminating card 112 of the main portion of the network, switching may be effectuated in the backup portion of the network without affecting the output signal from line card 172. Thus, as may be seen, line card 150 is coupled to originating stage card 152 which in turn is coupled to center stage card 160 which is coupled to terminating stage card 168 which is coupled to line card 114.

Figure 6A:
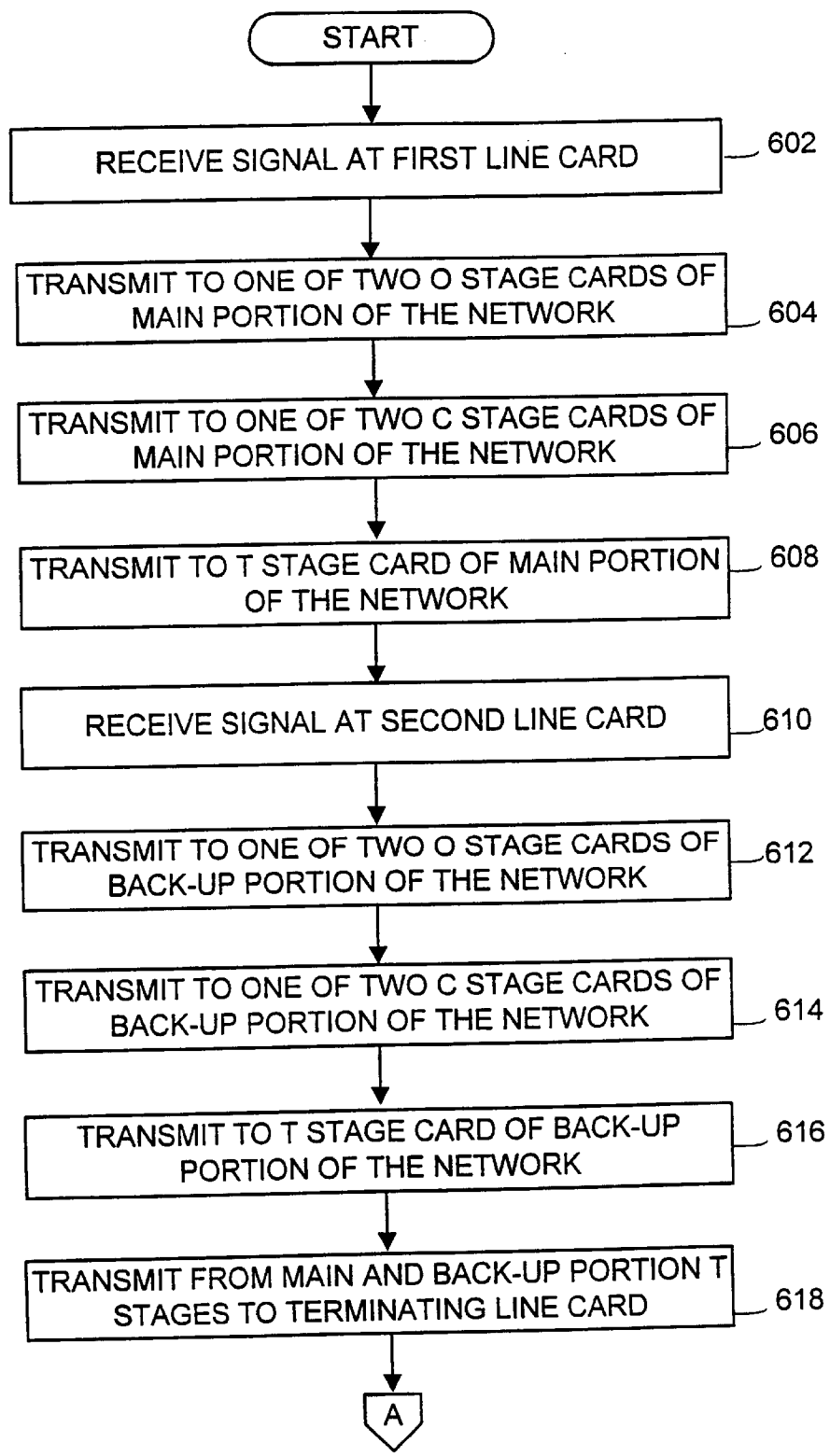
FIGS. 6A and 6B are flow charts illustrating one method for switching center stages without introducing framing errors for a cross connect network having non frame aligned main and backup portions according to a an embodiment of the invention.
Figure 6B:
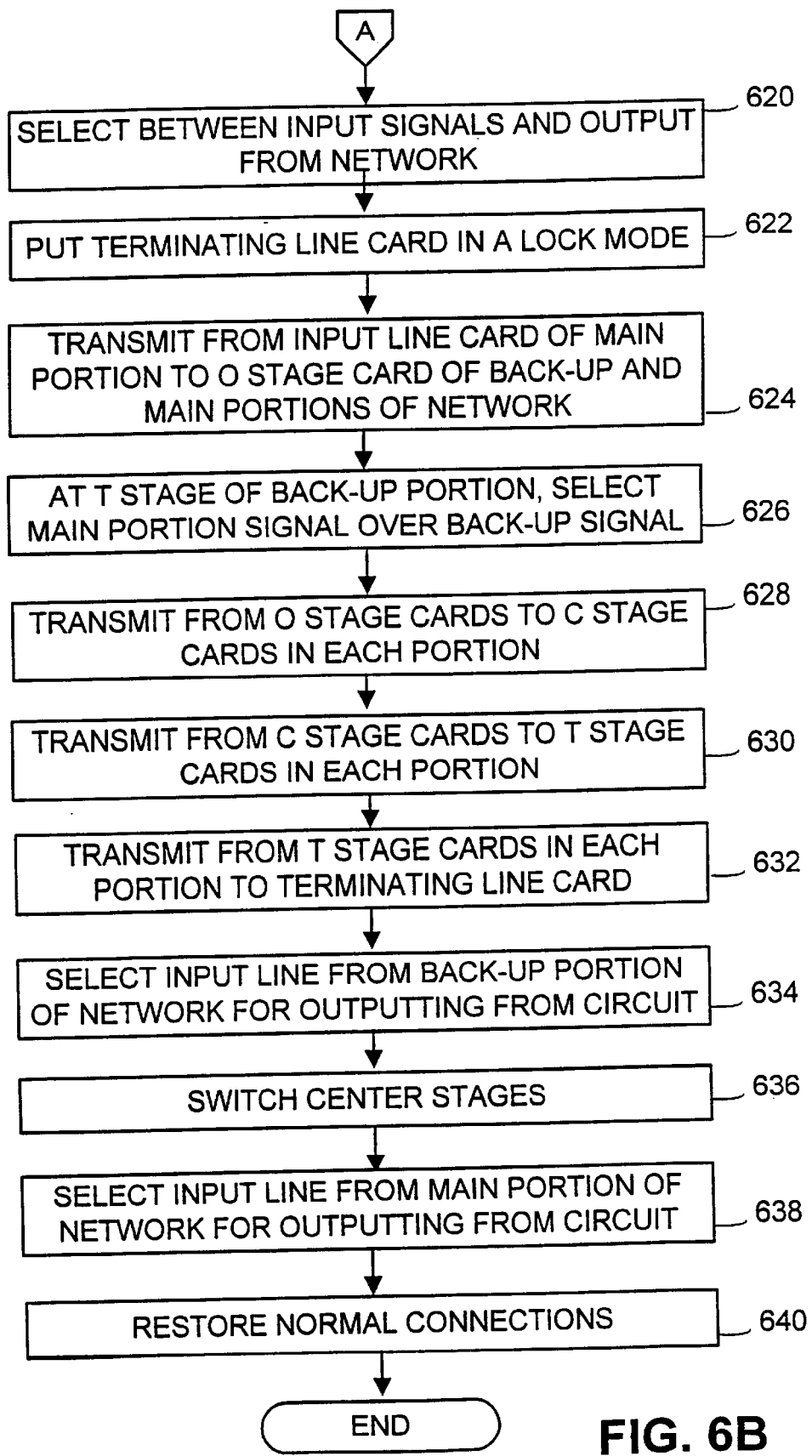

The coupling of matrix elements from the backup portion of the network to a main portion network element thus enables a procedure to switch center stages in a main portion of a network without introducing framing errors. FIGS. 6A and 6B are flow charts illustrating one method for switching center stages without introducing framing errors for a cross connect network having main and backup portions that are not frame aligned according to an embodiment of the invention. Referring now to FIG. 6A, a first input line card for a main portion of network having a main portion and a back-up portion receives a signal (step 602). Thereafter, the method includes transmitting the received signal to one of at least two originating stage cards in the main portion of network (step 604). Thereafter, the signal is transmitted from the originating stage card to one of at least two center stage cards of the main portion of the network (step 606). The signal is then transmitted to a terminating stage card of the main portion of the network (step 608).

The method further includes receiving the same signal, at a second input line card wherein the second line card corresponds to the back-up portion of the network (step 610). The second input line card then transmits the received signal to one of at least two originating stage cards of the back up portion of the network (step 612). The originating stage card that receives the signal then transmits the signal to one of at least two center stage cards of the back-up portion of the network (step 614).

Typically, a network portion includes two center stage cards in certain configurations. Sometimes, however, a third center stage card may be used for specified procedures and on a temporary basis. The center stage card that receives the signal then transmits the signal to a terminating stage card of the backup portion of the network (step 616). Once the terminating stage card of the primary network receives the signal in step 608, it transmits it to a terminating line card. Similarly, whenever the terminating stage card for the backup portion of the network receives a signal, it too transmits it to the same terminating line card (step 618).

Referring now to FIG. 6B, it is the terminating line card that receives the signals from the two terminating stages that decides, based on parameters such as signal quality, which signal source it prefers to output from the network. Thus, the terminating line card selects the input signal and then produces it as an output of the network (step 620). The selection is based on several criteria. For example, the detection of the conditions such as Path Alarm Indication Signal (AIS-P), Path Loss of Pointer (LOP-P), or incorrect signal label. Additionally, excessive path bit error rates may also trigger a failure condition to cause the output terminating line card to switch from one signal path to the other for outputting the signal.

As is suggested by the previous discussion, the terminating line card functions as a switch wherein one input signal is coupled to an output port and is transmitted therefrom. For the described embodiment, the terminating line card actually receives and analyses the signals from both the main terminating stage card and from the backup terminating stage card. In the described embodiment, the terminating line card must receive the signals from both terminating stage cards so that it may evaluate the signal quality from each signal path.

The following steps are those that are specifically followed to change center stages without introducing a framing error in those networks having two or more input line cards as shown herein FIGS. 1–5. Initially, the terminating line card is put into a lock mode (step 622). A lock signal is transmitted to the terminating line card to place in a lock mode. In one embodiment, the terminating line card stays in a lock mode as long a signal with a defined state is received at a specified input pin. While in the lock mode, the terminating line card does not switch outputs from the signals received from one matrix portion to the other. For the following example of steps, it is assumed that the signal in the main portion of the network is the signal that is currently selected by the terminating line card.

First, the input signal received by the originating line card for the main portion of the network is transmitted to one of at least two originating stage cards of the main and backup portions of the network (step 624). In addition to transmitting the received signal from the line card for the main portion to the O stage card to the back-up portion, the back-up signal transmissions are no longer selected by the back up portion T stage card (step 626).

The signal is then transmitted from the originating stage cards in the back-up and main portions to one of at least two center stage cards of the backup and main portions of the network (step 628). The signal is then transmitted from the center stage cards of the back-up and main portions to the terminating stage cards of the back-up and main portions of the network (step 630). The back-up and main portion terminating stage cards then transmit the signal to the terminating line card for the main and backup networks (step 632).

At this point, the signals received from the terminating stage cards from both the main and backup portions of the network are frame aligned because they both originated from the same input line card. Because the input signals to the terminating line card are now frame aligned, the terminating line card may switch the selected signal for outputting from the matrix arrangement without introducing a framing error. Thus, the terminating line card selects the signal received from the terminating card of the backup portion of the network (step 634).

Thereafter, the main portion center stage matrix element may be switched because the signal is no longer being conducted through the main portion of the network (step 636). Once the center stage has been switched in the main portion of the network, the terminating line card may select the signal received from the main portion of the network for output (step 638). Even though center stage matrices have been changed in the main portion of the network, the signals being received at the terminating line card are still frame aligned because the signals originate from the same input line card.

Once the terminating line card has switched its signal source back to the main portion of the network, normal connections and operations are restored (step 640). In other words, the signal received by the input line card for the backup portion of the network is allowed to propagate through the backup portion of the network. Moreover, as a part of restoring normal operations, the terminating line card is taken out of its lock mode so that it may freely select between input signals from the terminating stage cards of the main and backup portions of the network after the back-up path has been rearranged for conducting the back-up signal and the T stage card has selected the C stage output carrying the back-up signal.

The steps in the above-illustrated method are performed whenever the terminating line card is outputting the signal received from the main portion of the network. If, on the other hand, the terminating line card has selected the signal received from the terminating card of the backup portion of the network, and a center stage for the backup portion of the network needs to be switched, the method employed would be similar with the exception that the actual network elements and the connections would be opposite or a mirror image of that described.

Referring again to FIG. 2, in this scenario, line card 150 would receive the signal and would transmit it to originating stage card 104 of the main portion of the network which, in turn, would transmit it to center stage card 110. Center stage card 110 would then transmit the signal to terminating stage card 112. Terminating stage card 112, in turn, would transmit it to terminating line card 114. While the specific center stage cards may be varied through the main portion of the network or through the backup portion of the network, there is one aspect that does not change. Namely, an input line card produces a received signal to originating stage cards of both the main and backup portions of the network so that the terminating line card for the entire network receives signals that are frame aligned regardless of the terminating card from which the signals are received.

Figure 7:
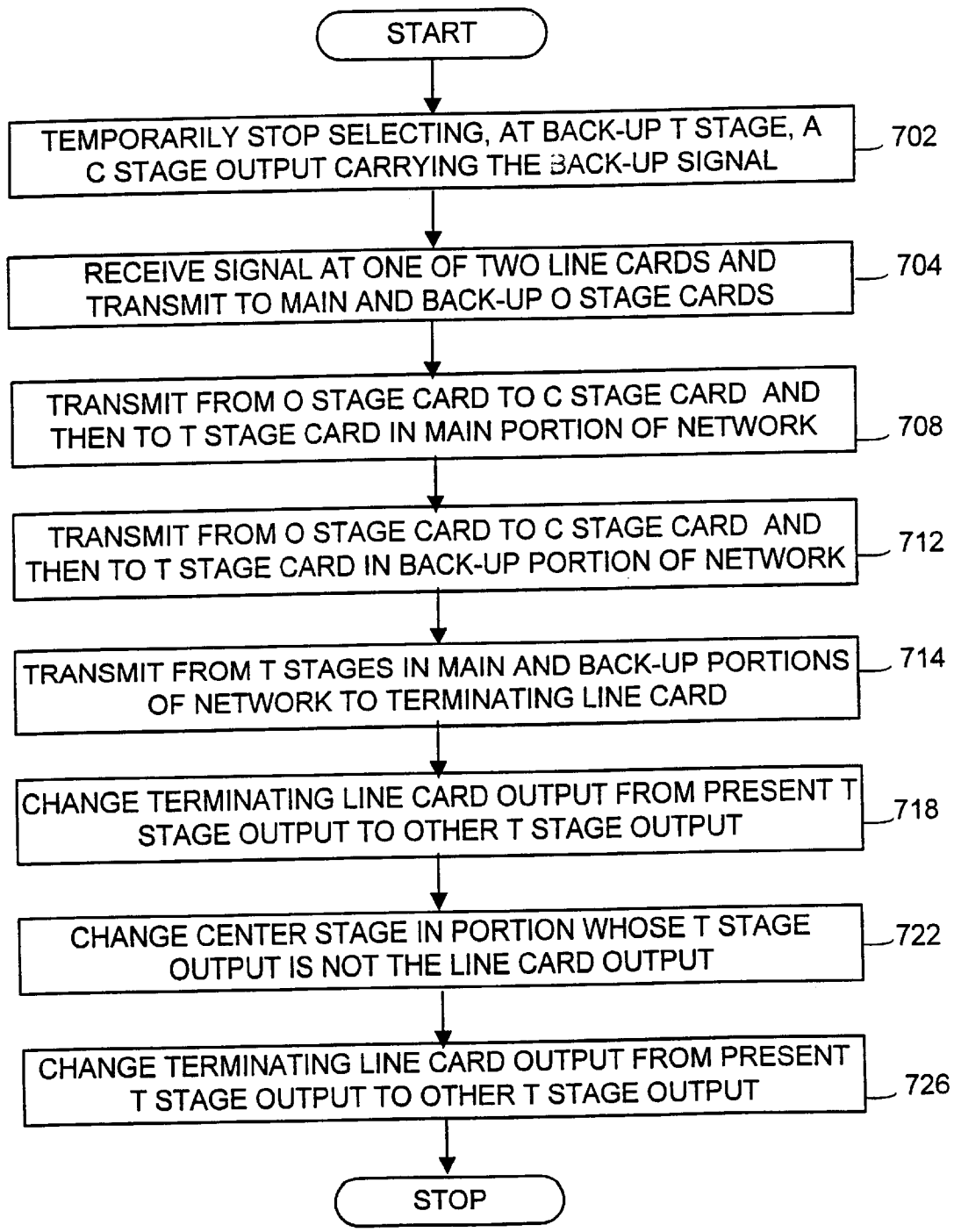
FIG. 7 is a flow chart that illustrates a method for switching center stages in a network having a main portion and a backup portion and input line card for each portion.

FIG. 7 is a flow chart that illustrates a method for switching center stages in a network having a main portion and a backup portion and input line card for each portion. Referring now to FIG. 7, protection path or back up signaling that is ordinarily transmitted through the back-up portion while the main signal is transmitted through the main portion of the network. The first step of the invention thus involves temporarily ceasing to select the back-up signal being produced on a C stage output line (step 702). Stated differently, one of the signals is prevented from being transmitted through its corresponding network portion.

By way of example, if it is the back-up signaling that is being produced from the matrix network and there is a need to switch center stages in the back-up portion of the network, the main signal is temporarily prevented from being transmitted completely through the main portion of the network. As before, the main signal is not selected from the C stage output by the main portion T stage card. Alternatively, if the main signal is being output from the matrix network, the back-up signal is temporarily not selected by the back-up portion T stage card.

Thereafter, a signal is transmitted to originating stage cards for both the primary portion and backup portion of the network by one of the input line cards for the main and back-up network portions (step 704). For example, if it is the back-up signal that is temporarily not selected in step 702 in favor of the main portion signal, then the output of the input line card for the main portion of the network is produced to the O stage cards for the main and back-up networks. The signal is then transmitted from the main and backup originating stage cards to center stage cards of the main and backup portions, respectively (step 708).

Thereafter, a signal is transmitted from the main and backup center stage cards to terminating stage cards for the main and backup portions of the network (step 712). Thereafter, a signal is transmitted from the terminating stage cards of the backup and main portions of the network to a terminating line card (step 714). At this point, the terminating line card receives the signal from each path in a frame aligned manner.

Accordingly, the method further includes switching from a terminating stage of one of the main or backup portions to the terminating stage of the other of the main and backup portions of the network (step 718).

Thereafter, the center stage may be changed for the network portion through which the signal is not being selected and output from the terminating line card (step 722). Finally, the method includes switching from the present terminating stage to the other terminating stage to restore the previous network to the previous operating state (step 726). At this time, the center stage of the other matrix portion may be switched or rearranged.

The inventive cross connect method and apparatus disclosed herein are particularly advantageous in that circuitry efficiencies are improved. More specifically, re-framing is not required whenever a center stage matrix needs to be switched because the two circuit portions are temporarily frame aligned and redundant operations are suspended until the center stage is switched.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims. As may be seen, the described embodiments may be modified in many different ways without departing from the scope or teachings of the invention.

What is claimed is:

1. In a matrix network comprising a main portion and a backup portion, wherein each portion includes an input line card, at least two originating stage matrix cross point switches, at least two center stage cross point switches and at least one terminating stage cross point switch and wherein the network includes one terminating line card for receiving and selecting between signals produced by the terminating stage cross point matrix switch of the main portion and the backup portion, an improved method for switching center stages without introducing framing error, comprising:
   outputting a signal from an input line card to an originating stage matrix card for each of the main and backup portions;
   conducting the signal through the main and backup portions;
   receiving, at a terminating line card, each of the signals from the main and backup portion terminating stage matrices; and
   at the terminating line card, switching input signal sources at the terminating stage matrix card currently providing a signal for outputting from the terminating line card to the other terminating stage matrix card.

2. The method of claim 1, further comprising the step of switching center stages in the network portion from which the signal for outputting from the terminating line card is not being received.

3. The method of claim 2, further including the step of restoring signal transmissions through the main and backup portions to the ordinary state.

4. The method of claim 3, further including the step of rearranging the center stage and connections within one of the main and backup portions to the ordinary state wherein the one of the main and backup is the one not conducting the signal that is presently selected by the terminating line card.

5. A method, in a three stage cross connect matrix system having main and backup portions that each include an originating O, center C and terminating T stages, wherein the main and backup portions are not frame aligned, comprising:
   transmitting a signal from the main portion into the backup portion;
   at a terminating line card coupled to receive signals from each of the main and backup portions, selecting the signal from the backup portion;
   switching center stages in the main portion; and
   at the terminating line card, selecting the signal from the main portion.

6. The method of claim 5 further including the step of transmitting the signal through the O, C and T stages of the main portion of the network.

7. A cross connect matrix network, comprising:
   a main portion, the main portion comprising:
      at least one O stage mix element having an input and an output;
      at least one C stage matrix element having an input coupled to the output of the O stage matrix element and having an output; and
      at least one T stage matrix element having an input coupled to the output of the C stage matrix element and having an output;
   a back-up portion, the back-up portion comprising:
      at least one O stage matrix element having an input and an output;
      at least one C stage matrix element having an input coupled to the output of the back-up portion O stage matrix element and having an output; and
      at least one T stage matrix element having an input coupled to the output of the back-up portion C stage matrix element and having an output;
   a main portion originating line card for receiving a signal for the main portion and coupled to produce the signal to at least one main portion O stage matrix element;
   a back-up portion originating line card for receiving a signal for the backup portion and coupled to produce the signal to at least one backup portion O stage matrix element; and
   wherein the main portion originating line cards also is coupled to produce the signal to O stage cards of the back-up portion of the matrix system.

8. The cross connect matrix network of claim 7 further wherein the C stage output of the back-up portion originating line card carrying the signal from the back-up portion originating line card is temporarily not selected by the T stage card to which the C stage card is coupled.

9. The cross connect matrix network of claim 7 further including a terminating line card coupled to receive the signal from both the back-up portion T stage card output and the main portion T stage card output.

10. The cross connect matrix network of claim 9 wherein the terminating line card includes a port to receive a lock signal to temporarily place it into a lock mode of operation to prevent it from changing from the specified main or backup T stage output signal for outputting from the network.

11. The cross connect matrix network of claim 9 wherein the terminating line card includes a switch for selecting between an output either the signal from the back-up portion T stage card output and the main portion T stage card output.

12. The cross connect matrix network of claim 11, wherein the main portion rearranges connections between the O stage, C stage and T stage matrix elements after the main portion originating line card produces the signal to O stage cards of the back-up portion of the matrix system and the terminating line card selects the output from the signal from the back-up portion T stage card output.

13. A method for rearranging connections in a switch having a main matrix for switching a main signal and a backup matrix for switching a backup signal, wherein the main matrix and backup matrix have multiple stages, comprising:
   transmitting the main signal to the backup matrix for switching through the backup matrix;
   outputting the main signal from the backup matrix;

receiving the main signal as an output of the main matrix and back up matrix at a line card and selecting the main signal from the output of the back up matrix;

rearranging connections in the multiple stages of the main matrix;

selecting the main signal from the output of the main matrix at the line card.

14. The method of claim 13, wherein the main signal and backup signal are the same signal with a different delay.

15. The method of claim 13, wherein the multiple stages of the main matrix and the backup matrix each include at least two originating stages, at least two center stages and at least one terminating stage.

16. The method of claim 15, wherein the step of rearranging connection in the multiple states of the main matrix includes rearranging connections to switch from one center stage to another center stage.

17. The method of claim 13, further comprising the step of:

after rearranging connections in the multiple stages of the main matrix and selecting the main signal from the output of the main matrix at the line card, transmitting the main signal through the main matrix and the backup signal through the backup matrix.

* * * * *